Figure 1:
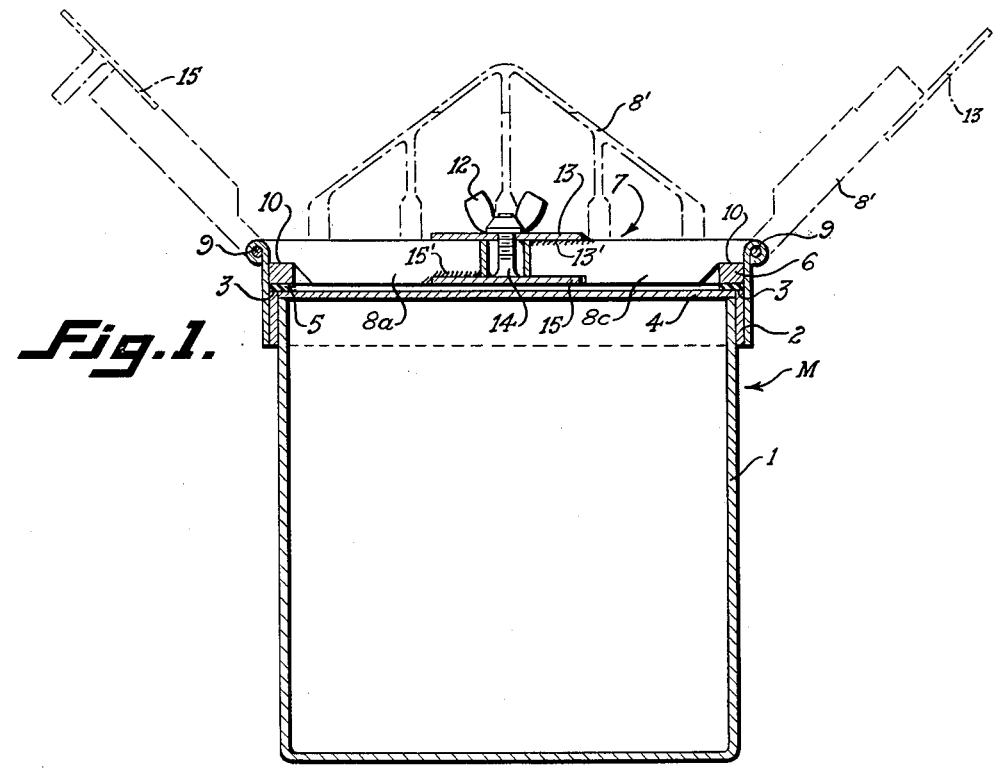

June 20, 1950   G. T. BAU   2,512,475

PRODUCTION OF LATEX FOAM SPONGE PRODUCTS

Filed June 30, 1947

INVENTOR.
George T. Bau.
BY
Alfred W. Knight
ATTORNEY

Patented June 20, 1950

2,512,475

UNITED STATES PATENT OFFICE 2,512,475

PRODUCTION OF LATEX FOAM SPONGE PRODUCTS

George T. Bau, North Hollywood, Calif.

Application June 30, 1947, Serial No. 758,006

9 Claims. (Cl. 260—723)

This invention relates to the production of latex foam sponge products, and particularly to a novel and advantageous process of making such products having an open cell structure, that is, a structure which provides a multiplicity of small air cells distributed throughout the product and in communication with each other through small openings in the cell walls. The invention provides for making such products from either natural or synthetic rubber latex.

The general term "latex" will be used hereinafter to designate an aqueous dispersion of a resilient material having the pertinent characteristics of rubber, such as an aqueous dispersion of natural rubber, or of a synthetic elastomer having the pertinent characteristics of rubber, such rubber-like elastomers being commonly referred to as synthetic rubbers. Similarly, the term "rubber" will be used to include both natural rubber and the above mentioned synthetic rubber-like elastomers.

This application is a continuation-in-part of my application Serial Number 617,451, filed September 19, 1945, and now abandoned.

The principal object of my invention is to provide a simple and comparatively rapid process for making such open cell latex foam sponge products having very good physical properties, such as strength and elasticity, from either natural or synthetic latex.

A particular object is to produce such products which have a substantially uniform porous structure throughout all portions thereof, resulting in highly uniform strength, elasticity, compressibility, and other desired physical characteristics.

Another particularly important object is to provide for the production of latex foam sponge products of considerably greater thickness than has been found possible by former methods, particularly when using synthetic latex.

Another particular object of the invention is to produce either natural or synthetic latex foam sponge products having unusually high compression modulus and tensile strength.

A further object is to provide a process of making molded latex foam sponge products having high fidelity of reproduction of the shape of the mold, including the ability to accurately reproduce detail in the mold.

Another object is to provide a process in which latex of relatively low concentration may be used, thus effecting economies in manufacture not only because of the lower cost of latices of low concentration as compared with more concentrated latices but also because of the elimination of the loss of rubber that generally results from gelling of some of the rubber during concentration.

A further object is to provide a process which results in relatively little shrinkage of the final sponge product after removal from the mold.

Other objects and advantages of my invention will be pointed out hereinafter or will be apparent from the following description.

According to my invention the latex is frothed in the presence of an added frothing agent that is capable of gelling to form a reversible gel prior to or during the gelling of the rubber content of the latex to its irreversible gel condition, by the action of an added gelling agent that will gel both the frothing agent and the latex and that will not act to destroy or break up the reversible frothing agent gel when the rubber gels or shortly thereafter, whereby the frothing agent gel can be maintained along with the rubber gel until the latter has been sufficiently cured to be self-supporting. The mixture of latex with the desired frothing agent (and preferably also containing other ingredients as described hereinafter) is subjected to vigorous agitation or beating action in the presence of air, so as to cause a multicplicity of small air bubbles to be entrapped therein, forming a stable froth. The gelling agent may be added either before, during, or after the frothing operation, and the frothed mixture containing the gelling agent is poured into a mold, in which it is gelled and cured.

The frothing composition used in my process contains, as the essential frothing agent, ethanolamine soap, and may be prepared by heating a mixture of fatty acid, ethanolamine, and water, to form ethanolamine soap in solution, which is preferably cooled before addition to the latex. A typical example of ingredients and approximate proportions thereof (by weight) is as follows:

| | Parts |
|---|---|
| Fatty acid | 1 |
| Ethanolamine | 1 to 3 |
| Water | 3 to 6 |

The fatty acid may be, for example, stearic acid, oleic acid, palmitic acid, or mixtures thereof, or mixed fatty acids from cocoanut oil. I have obtained the best results by the use of stearic acid or a mixture of stearic and oleic acids. The ethanolamine may be either triethanolamine, diethanolamine or monoethanolamine, or a mixture thereof, but I have found that either triethanolamine, or a mixed ethanolamine product consisting principally of triethanolamine, is most suitable. The amount of ethanolamine soap used may vary within rather wide limits, for example, from 1% to about 10% or more by weight of the rubber solids in the latex.

The gelling agent which I use in combination with the above described frothing agent is an alkali metal silicofluoride. Although either sodium or potassium silicofluoride may be used, the former is generally preferable because of lower cost. The proportion of silicofluoride may be from about ½% to about 5% by weight of the rubber solids in the latex. I prefer to first mix the silicofluoride gelling agent with suitable proportions of ethanolamine and water to form a gelling composition containing the silicofluoride in a form in which it may be more readily added to and mixed with the frothed latex. For this purpose I may mix these ingredients, for example, in the proportion of about 1 to 3 parts by weight of ethanolamine and about 4 to 8 parts of water, to two parts of sodium silicofluoride. In this case also the ethanolamine may be either triethanolamine, diethanolamine, or monoethanolamine, or mixtures thereof, but here again I have found that triethanolamine, or a mixed ethanolamine product consisting principally of triethanolamine, is most suitable. Such a gelling composition can be prepared and added to a frothed mixture of latex and the above described frothing agent; or the gelling composition may be added to the mixture of latex and frothing agent prior to or during the frothing operation; or, if desired, I may prepare a composition containing both the frothing agent and the gelling agent and add this to the latex prior to or during the frothing operation.

In addition to the above-mentioned frothing and gelling agents, other ingredients are also added, preferably prior to the frothing step, and may be either added directly to the latex or mixed with the frothing composition prior to adding the latter to the latex. Such additional ingredients may include:

Ethanolamine, as a stabilizing agent, to stabilize the froth and prevent too sudden gelling of the latex. As noted above, part or all of this ethanolamine (in addition to the amount used in forming the ethanolamine soap frothing agent) is advantageously mixed with the silicofluoride gelling agent before its addition to the latex, and some excess of ethanolamine may also be used in preparing the ethanolamine soap frothing composition.

Curing agents, such as sulphur or sulphur bearing compounds.

Cure accelerators, preferably those known as "ultra accelerators," such as zinc dibutyldithiocarbamate, zinc diethyldithiocarbamate, or zinc dimethyldithiocarbamate. I prefer to use zinc dibutyldithiocarbamate because it is faster and, since my process avoids the use of zinc oxide, I eliminate an objectionable feature of this accelerating agent, namely, a tendency to cause excessive thickening of latex compositions containing zinc oxide.

Antioxidants, such as hydroquinone mono benzyl ether, or symmetrical di-beta naphthyl-araphenylinediamine.

Vegetable, animal or mineral oils or waxes, as plasticizers, particularly when a soft, tough sponge is to be produced. Castor oil is excellent for this purpose, as is also the glyceride of ricinoleic acid.

As an additional component, I prefer to add a small amount of titanium dioxide either directly to the latex or, preferably, to the frothing composition before its addition to the latex. I have found that the addition of a small proportion of titanium dioxide based on the dry rubber content of the latex, in conjunction with the above-mentioned frothing and gelling agents, greatly facilitates the frothing operation and the pouring of the frothed mixture into molds, and also accelerates the gelling action. In addition to gelling the rubber, the titanium dioxide also promotes gelling of the ethanolamine soap. The proportion of titanium dioxide may be from about ½% to about 5% by weight of the rubber solids in the latex. I prefer to use from 1% to 2%, and about 1% is generally satisfactory.

For example, a foam prepared by the use of ethanolamine soap, stabilized with ethanolamine, and sensitized with sodium silicofluoride in such proportions that two hours would be required for gelling at room temperature, can be accelerated by the addition of one per cent titanium dioxide on the above basis so as to cause gelling to occur in ten minutes. Furthermore, the mixture will froth more readily and will be less viscous in pouring, thereby preventing objectionable "overlaps" in pouring, which would produce large air pockets in the froth and in the resulting gelled mass. In addition, the frothed mixture will pick up more detail in the mold and will be mobile enough to level itself on its top surface. These advantages in frothing and pouring appear to be due to a "thinning" action of the titanium dioxide, and make it possible, if desired, to use a more concentrated latex than would otherwise be suitable. For example, without the use of the titanium dioxide I am unable to readily pour frothed mixtures made according to my process from latex containing sixty per cent solids without addition of considerable water, while by adding about one percent titanium dioxide (based on dry rubber content) such mixtures can be readily poured.

The preparation of the gelling composition, the mixing of the frothing composition, gelling composition, and other constituents with latex, and the frothing and gelling of the resulting mixture will be described more fully hereinafter, in connection with certain typical or preferred embodiments of the invention. According to any of the procedures herein described, the frothed latex containing the added frothing and gelling agents and other constituents, is caused to gel by standing, either at atmospheric temperature or above.

The addition of a silicofluoride to cause gelling of frothed latex mixtures has heretofore been proposed and used by others. However, in these previous processes the silicofluoride has acted only to gel the latex, resulting in the formation of an open-cell gel structure which does not have sufficient strength to support the weight of a body of gel of any considerable depth. This defect is particularly notable in the case of synthetic latices, which upon gelling do not have as satisfactory supporting strength as natural latex gels, and has seriously limited the thickness of latex foam sponge that can be produced, especially from synthetic latices, without resulting in collapsing of the porous mass prior to curing or the production of serious distortion in the shape and uniformity of the pores in the final product.

According to my process, as noted above, the silicofluoride exerts a marked gelling action on the ethanolamine soap frothing agent as well as on the latex, and the ethanolamine soap forms a closed cell gel structure which has a comparatively high supporting strength. Furthermore, this closed cell structure is capable of being maintained, to assist in supporting the weight of a gelled body of relatively great depth or thickness, until the curing of the gelled rubber is nearly completed and the rubber has developed sufficient strength to support the weight of the mass.

As a further important and novel feature of my process, the resulting body of frothed and gelled latex, with its closed air cells, is cured by heating it in a tightly enclosed space while substantially completely preventing the escape of air therefrom. This is done by heating the gelled froth in a tightly sealed air-tight mold, whereby the air cells throughout the entire body of material are prevented from being ruptured by the internal pressure of the heated air and are maintained closed during the major portion of the curing period and until the cured rubber has developed sufficient strength to be self-supporting.

As has been noted above, the ethanolamine soap gel is reversible. In the final stage of the curing process, this latter gel breaks down and reverts to a fluid or sal condition. According to my invention, therefore, I continue the heating of the material in the tightly closed air-tight mold, until the ethanolamine soap gel has been converted to a liquid state, forming openings in the cell walls and leaving only the open-celled latex foam sponge.

Figure 2:
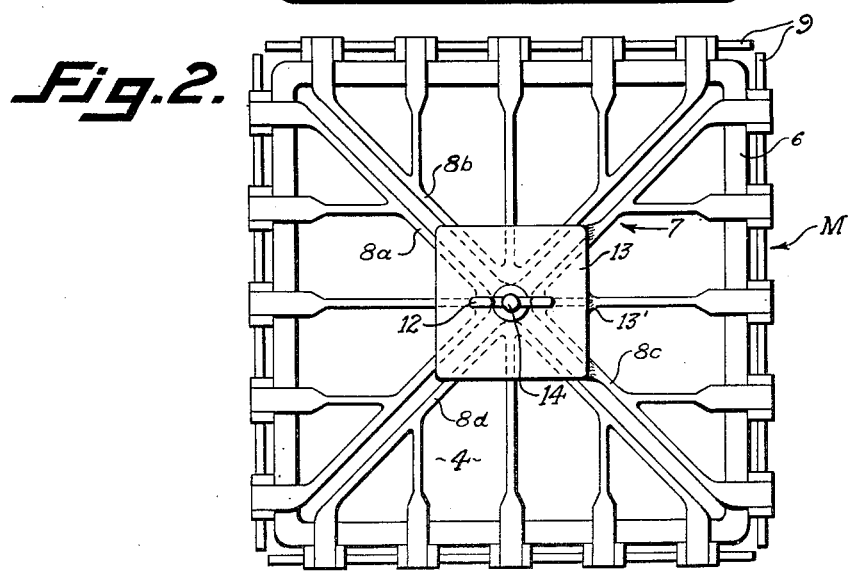

An example of an air-tight mold that may be used in the practice of my invention is shown in the accompanying drawings, in which:

Fig. 1 is a vertical sectional view of such a mold in closed position, with the open position of the clamping means shown in dot-dash lines; and Fig. 2 is a plan view thereof.

The mold M shown in Figs. 1 and 2 comprises a box or casing 1 closed at the bottom and sides and open at the top, and provided with quick-acting closure means for closing the top of the casing. A strip 2 extends continuously around the upper portions of the casing side walls and is tightly secured thereto, and projects above the upper edges of the side walls to provide a shoulder at 3. A cover plate 4 is removably disposed on the upper edges of the casing side walls and completely covers the interior of the mold at the top. The joint between cover plate 4 and shoulder 3 is closed by a gasket 5. A continuous compression band or strip 6 is adapted to compressively engage gasket 5 and hold it in tight sealing engagement with cover plate 4 and shoulder 3, being forced into such compressive engagement by clamping means indicated generally at 7.

Clamping means 7 comprises four flaps 8a, 8b, 8c and 8d of triangular shape, hingedly mounted at 9 on the respective side walls of casing 1, for movement between a closed position engaging compression strip 6, as shown at 10 in Fig. 1, and an open position (indicated in dot-dash lines at 8' in Fig. 1) permitting removal of the members 4, 5 and 6. When in the closed position, the flaps are forced downward against strips 6 by means of a wing-nut 12 bearing against an upper centrally located plate 13 secured to the inner portion of flap 8c and adapted to bear downwardly upon the inner portions of the other three flaps, said wing-nut engaging a threaded bolt or stud 14 secured to a lower centrally located plate 15 secured to the inner portion of flap 8a and extending beneath the inner portions of the other three flaps. The flaps 8a and 8c are secured to the plates 13 and 15 respectively, by welding as indicated at 13' and 15'.

With the flaps in open position and the parts 4, 5, 6 and 12 removed, the frothed mixture to be gelled and cured is poured into the mold. When it is desired to close the mold, the cover 4, gasket 5 and compression band 6 are placed in position on the casing 1. First the flap 8a, then the flaps 8b and 8d, and finally the flap 8c, are then swung inward and downward to bring them into engagement at 10 with the compression member 6, and the wing-nut 12 is then placed on bolt 14 and screwed down against the upper plate 13. The shape and relative disposition of the parts are such that the flaps will engage the compression member and press the gasket 5 into tight sealing engagement with members 3 and 4 before the flaps are lowered to horizontal position, so that such tight sealing engagement is obtained by screwing the wing-nut 12 down to transmit the necessary downward closing pressure through plate 13, flaps 8a, 8b, 8c and 8d, and compression member 6, to the gasket.

The following formulae illustrate typical examples of constituents and proportions that may be used in the practice of my invention.

*Formula A*

| | Parts by weight |
|---|---|
| Latex (50% solids) (based on dry rubber content) | 100 |
| Stearic acid | 1 |
| Triethanolamine | 3 |
| Zinc dibutyldithiocarbamate | 2 |
| Dispersed sulphur | 2 |
| Symmetrical di-beta naphthyl-paraphenyline-diamine | 2 |
| Titanium dioxide | 1 |
| Sodium silicofluoride | 1.5 |
| Water (in addition to water in latex) | 6 to 10 |

*Formula B*

| | Parts by weight |
|---|---|
| Latex (50% solids) (based on dry rubber content) | 100 |
| Stearic acid | 1 |
| Oleic acid | 0.25 |
| Triethanolamine | 3 |
| Zinc dibutyldithiocarbamate | 2 |
| Dispersed sulphur | 2 |
| Symmetrical di-beta naphthyl-paraphenyline-diamine | 2 |
| Titanium dioxide | 1 |
| Sodium silicofluoride | 1.2 |
| Water (in addition to water in latex) | 6 to 10 |

*Formula C*

| | Parts by weight |
|---|---|
| Latex (40% solids) (based on dry rubber content) | 100 |
| Stearic acid | 2 |
| Triethanolamine | 4 |
| Zinc dibutyldithiocarbamate | 2 |
| Dispersed sulphur | 2 |
| Symmetrical di-beta naphthyl-paraphenyline-diamine | 2 |
| Titanium dioxide | 0–1 |
| Sodium silicofluoride | 2.5 |
| Water (in addition to water in latex) | 3 to 6 |

Formula D

| | Parts by weight |
|---|---|
| Latex (50% solids) (based on dry rubber content) | 100 |
| Stearic acid | 0.5 |
| Oleic acid | 0.5 |
| Castor oil | 5 |
| Triethanolamine | 3 |
| Zinc dibutyldithiocarbamate | 1.5 |
| Dispersed sulphur | 1 |
| Symmetrical di-beta naphthyl-paraphenyline-diamine | 2 |
| Titanium dioxide | 1 |
| Sodium silicofluoride | 0.8 |
| Ammonia | 0.1 |
| Water (in addition to water in latex) | 6 to 10 |

In each of the above formulae, the latex may be a dispersion of natural rubber, such as hevea brasiliensis, or of a synthetic rubber such as Buna S (a butadiene-styrene co-polymer), Buna N or Perbunan (a butadiene-acrylonitrile co-polymer), or a modified diolefin or butadiene co-polymer. It will of course be understood that some variations may be found desirable in the formulae, for different latices or for different batches of a certain latex.

I will now describe in greater detail some typical embodiments of my process for the production of latex foam sponge. The first of these examples will be described particularly with reference to a procedure using ingredients as shown in Formula A above.

The curing agent (sulphur), cure accelerator (zinc dibutyldithiocarbamate), and antioxidant (symmetrical di-beta naphthyl-paraphenylinediamine) are used in the proportions shown. These are all readily obtainable in the form of aqueous dispersions and need no further preparation.

The titanium dioxide is preferably prepared by grinding 1 part thereof with 2 parts of water in a pebble or ball mill for several hours, or by grinding on a roller mill with a smaller proportion of water, until the titanium dioxide is all reduced to finely divided condition and thoroughly dispersed in the water.

A frothing composition is prepared by mixing 1 part of stearic acid with 2 parts of triethanolamine and about 4 or 5 parts of water, heating, and allowing the resulting ethanolamine soap composition to cool. The titanium dioxide, preferably prepared as described above, is then preferably added to this frothing composition. The resulting composition can then be added to the latex, and the other ingredients added later. However, for best results I prefer to add the curing agent, accelerator, and antioxidant to this ethanolamine soap frothing composition before mixing it with the latex, and I find it advantageous to previously prepare and thoroughly mix a large quantity of this mixture containing the ethanolamine soap, titanium dioxide, curing agent, accelerator, and antioxidant, and then add the proper amount of this mixture to the latex in preparing a given batch for frothing. Such mixtures (without the latex) can be prepared and kept for periods of several months, and works equally as well as freshly prepared mixtures.

In this embodiment of my process the gelling composition is prepared separately, and for this purpose the 1.5 parts of sodium silicofluoride is preferably ground in a pebble mill for at least 2 hours, with about 3 parts of water. Before this intergrinding, even the most finely powdered sodium silicofluoride commercially obtainable will settle almost immediately in water, whereas after grinding with water as described it stays at least partly in suspension for a reasonable period of time. I then add to this mixture 1 part of triethanolamine and stir to obtain thorough mixing. Some reaction, either chemical or physical, the exact nature of which I do not know, appears to take place upon adding the triethanolamine. A noticeable rise in temperature occurs, and the mixture first gels and then thins out and becomes fluid upon standing a few minutes.

As explained above, triethanolamine (in addition to the amount used to form the ethanolamine soap frothing agent) is used in my process for the purpose of stabilizing the frothing agent, and preventing too sudden gelling of either the frothing agent or the rubber. As the result of many experiments, I have found that it is decidedly advantageous to first mix at least some of this triethanolamine with the silicofluoride gelling agent, then add the resulting gelling composition to the frothed latex, instead of adding the silicofluoride and triethanolamine separately. By this procedure, the above mentioned reaction between the silicofluoride and triethanolamine takes place before adding to the latex, and the triethanolamine also acts as a protective agent and dispersing medium when the composition is added to the frothed latex, thus enabling the triethanolamine to perform to best advantage its stabilizing function of preventing too sudden gelling of the frothed latex or of the ethanolamine soap. If the triethanolamine is added to the frothed mixture of latex and frothing agent, and the silicofluoride is then added separately, either alone or after grinding with water, it is extremely difficult if not impossible to prevent some parts of the froth from gelling before the silicofluoride can be thoroughly mixed into the froth. Some parts of the froth will gel immediately upon contact with the silicofluoride, and objectionable large bubbles will be formed.

If desired, a very small amount (trace) of stearic acid may be used along with the triethanolamine in preparing the gelling composition, for the purpose of preventing settling or separation of the silicofluoride. However, if too much stearic acid is added to this composition it will become too gelatinous to pour, and this stearic acid addition is not necessary because any tendency to settle or separate on standing can be overcome by stirring the mixture before using it.

The above described mixture of latex and frothing composition, together with the titanium dioxide, curing agent, accelerator, and antioxidant, is subjected to a frothing operation to incorporate therein a multiplicity of small air bubbles, by a vigorous beating or whipping action, using any suitable type of beater or mixer such as commonly used for this purpose in the manufacture of latex foam. When the mixture has been frothed almost to the desired volume, the gelling composition prepared as described above is added and is thoroughly stirred into the froth. The gelling composition mixes readily with the froth without any noticeable breaking up of the air bubbles and without causing any formation of large bubbles or any immediate gelling in any part of the froth. It temporarily thins out the froth slightly, and increases the volume of the froth by about five per cent.

After thoroughly beating the gelling agent into the froth, the sensitized froth is poured into a suitable mold, where it is gelled and cured. This is preferably carried out in a mold of the type above described, so as to completely prevent escape of air from the material when it is heated to cure the rubber.

The desired quantity of the sensitized froth is poured into a suitable mold such as the mold M described above. In general, I prefer to substantially completely fill the mold, although this is not essential. The mold is then preferably tightly closed, as by placing the cover 4 on the mold M, and tightly securing it thereon by clamping means 7, so as to provide a substantially airtight enclosure as described above. The poured material may, if desired, be allowed to gel before applying heat, by simply standing at room temperature until gelled, which at ordinary atmospheric temperatures generally requires several hours. In such cases, the gelling may be carried out in the open mold, and the mold then closed prior to heating, or the mold may be closed prior to the gelling.

In order to expedite the process, however, I generally prefer to close the mold promptly after pouring, and then apply heat immediately to gel and cure the foam.

The mold containing the body of frothed latex mixture may be heated in any desired manner, for example, by means of hot air, steam, hot water, or electrical heating means. When the required curing temperature does not exceed the boiling point of water, I prefer to first immerse the mold in warm water and then gradually heat the water to the boiling point and maintain it at that temperature until the curing is completed. For example, when molding a body whose thickness or minimum dimension is four inches, and if a natural latex mixture prepared as described above is frothed and poured at a temperature of about 70° F., I prefer to immerse the mold in water at about 110° F., then heat the water gradually so as to bring it up to 212° F. in about 30 minutes, and keep it at this temperature for about 30 minutes.

If latices having a low rubber content are used, it may be necessary to heat to higher temperature, particularly in the case of certain synthetic latices such as Buna or Perbunan. Temperatures up to 300° F. are sometimes used. In such cases the mold may be heated by steam or hot air at the required temperature.

During the heating operation the pressure of the air in the closed cells of the gelled latex froth increases considerably. However, as has been noted above, this increased pressure does not tend to rupture the cell walls because the sealing of the mold prevents escape of air therefrom and the pressure within the mold is the same throughout. During the major portion of the curing period, and until the rubber has been cured sufficiently to be capable of supporting the mass throughout its vertical thickness of, for example, from 4 to 8 inches or more, the ethanolamine soap remains in gelled condition and provides a closed-cell structure of sufficient strength to support the weight during this period. The increased air pressure in the closed cells also serves to compact the walls between the cells and thus, together with the resultant formation of substantially spherical, rather than flattened, cells, appears to increase the modulus and tensile strength of the final product.

Another advantage of the use of tightly sealed molds is that there is no bodily movement or deformation of the material during curing, and the porous structure and physical characteristics remain uniform throughout. This is in sharp contrast to the results that would be obtained if a latex foam body having a closed-cell structure were heated in a vented mold or in a mold with a loosely fitting cover, which would permit expansion of the entrapped air on heating. This would cause some of the material to be forced out of the mold, with the result that the sponge would be compressed at or near the points of escape and greatly expanded in other portions.

As the curing of the gelled latex progresses, the water content of the ethanolamine soap gel gradually increases, and, since this latter gel is reversible, it finally breaks down and reverts to a fluid or sol condition during the last part of the curing period, leaving openings in the walls of gelled and cured latex between the cells, so that the final product has an open cell structure, and the ethanolamine soap is in the form of a solution and can easily be removed.

When the curing is completed, the heating is discontinued, and the mold is opened, as by releasing clamping means 7 and removing the cover 4. When the pressure is released, a considerable amount of ethanolamine soap solution is forced out of the rubber sponge product and out of the mold. The cured sponge product has no tendence to stick to the mold and can be easily removed therefrom. It may, if desired, be washed with water to remove remaining ethanolamine soap, and is then dried. The shrinkage on drying is only about 3%, which is much less than with latex foam sponge products made by other methods.

According to a second embodiment of the process for the production of latex foam sponge in accordance with this invention, the latex is mixed with the ethanolamine soap frothing composition and with the other ingredients, with the exception of the gelling composition, and the resulting mixture is partially precured by allowing it to stand, with or without heating, prior to the frothing operation.

In carrying out this embodiment of the process with ingredients according to Formula A above, the ethanolamine soap frothing composition is prepared as above described and titanium dioxide preferably in the form of a finely divided dispersion in water is mixed therewith. In this case also the curing agent, accelerator and antioxidant are preferably also added to this frothing composition, and the mixture of these ingredients is then added to and thoroughly mixed with the latex. This mixture may then be allowed to stand at room temperature for a period of from several hours to several months to effect partial precuring of the rubber, or may be kept at slightly elevated temperature for a period of from several hours to several days, or may be heated to about 150° F. for 30 minutes, to effect a partial precuring. If the mixture is heated much above room temperature during this precuring period, it is then preferably cooled. This partial precuring of the rubber prior to the frothing operation results in a more rapid curing of the froth mixture.

The partially precured latex mixture containing the frothing composition and other ingredients mentioned above is then beaten to a froth, the gelling composition prepared as described above is added thereto, and the sensitized froth poured into the mold and gelled and cured, in the same manner as described above.

In either of the two embodiments described above, the gelling composition may be added to the latex mixture containing the frothing composition, before or during the frothing operation instead of after the frothing operation.

According to a third embodiment of the process, the sodium silicofluoride gelling composition is added to the ethanolamine soap frothing composition before the frothing composition is mixed with the latex. This embodiment of the process is preferably carried out with the constituents and proportions shown in Formula B above, in which case the frothing composition is prepared by mixing one part of stearic acid and 0.25 part of oleic acid with 2 parts of triethanolamine and about 4 or 5 parts of water, heating, and allowing the resulting ethanolamine soap composition to cool. One part of titanium dioxide, preferably in the form of a finely divided dispersion in water is then added.

The gelling composition is prepared in the same manner as in the method first described, using 1.2 parts sodium silicofluoride, about 3 parts of water and 1 part of triethanolamine. This gelling composition is then added to the frothed composition containing the ethanolamine soap and titanium dioxide. This produces a strong gelling action on the ethanolamine soap, accompanied by evolution of considerable heat. However, after a short time the gelling action subsides and the mixture reverts to a mobile or fluent condition. In this condition, the mixture may be kept for a long period of time, and may be prepared in large quantities and stored for addition when desired. I find it particularly advantageous to prepare a large quantity of this mixture containing the frothing and gelling compositions together with the titanium dioxide, and also add thereto the curing agent (two parts of sulphur), the accelerator (2 parts of zinc dibutyl-dithiocarbamate) and the antioxidant (2 parts of symmetrical di-beta naphthyl-paraphenyline-diamine), and keep this mixture on hand for addition to the latex as desired. However, this mixture can be freshly prepared if needed, and added to the latex after standing for at least five minutes.

The prepared mixture containing the frothing agent, gelling agent, and titanium dioxide is then mixed with the latex and, if the curing agent, accelerator and antioxidant have not previously been added to the mixture, they are also added and thoroughly mixed at this point. The resulting mixture is then frothed, poured into a mold, and gelled and cured in the same manner as described above.

Numerous modifications may be made in the compositions and procedures described above, within the scope of my invention.

Thus, in any of the Formulae A, B, C or D, other fatty acids such as oleic or palmitic acid, or mixed cocoanut fatty acids, may be substituted for part of the stearic acid; diethanolamine or monoethanolamine may be substituted for part or all of the triethanolamine; or other accelerators such as zinc diethyldithiocarbamate or zinc dimethyldithiocarbamate may be substituted for part or all of the zinc dibutyldithiocarbamate; or other antioxidants such as hydroquinone mono benzyl ether may be substituted for part or all of the symmetrical di-beta napththyl-para-phenyline-diamine.

Furthermore, ingredients as shown in any of said Formulae A, B, C or D, or with substitutions as noted above, may be used in carrying out the process according to the various procedures.

For example, any of the specific embodiments of the process described above may be practiced in substantially the same manner with any of the other formulae, the proportion of the ingredients being varied as indicated in the formulae. Furthermore, the proportions of the ingredients in the various formulae may be varied within the ranges set forth herein. In each case, the frothing composition is prepared by mixing the fatty acid with ethanolamine and water, and additional ethanolamine is preferably added to the sodium silicofluoride in preparing the gelling composition.

If the percentage of rubber solids is relatively low, the titanium dioxide may be omitted if desired, as indicated by the range of 0 to 1 part of titanium dioxide in Formula C, in which the latex contains only 40% solids.

While I have referred to formation of a frothed liquid mixture containing closed air cells or bubbles, and to the increased air pressure created in such cells during curing, it will be understood that the cells or bubbles in the frothed mixture may contain any suitable gaseous medium, such as carbon dioxide, nitrogen, or other relatively inert gas, either alone or mixed with air. Such other gas could be introduced into the mixture during the frothing operation in any suitable manner, for example, by carrying out this operation in an atmosphere containing such gas, or by forcibly introducing such gas into the mixture during the agitation. Consequently, the term "air" as used in the above connection, in the specification and in the appended claims, is to be understood as including any suitable gaseous medium.

I claim:

1. In a process of producing a latex foam sponge product, the steps which comprise: preparing a frothed liquid mixture containing air bubbles and comprising latex and ethanolamine soap, the proportion of said ethanolamine soap being between 1% and about 10% by weight of the rubber solids in said latex; gelling said latex and said ethanolamine soap around said bubbles to form a body of solidified froth having closed air cells distributed therein; and heating said body in a tightly sealed space to cure the latex in said body while substantially completely preventing escape of air from said body and thereby maintaining said air cells closed during the major portion of the latex curing period.

2. In a process of producing a latex foam sponge product, the steps which comprise: preparing a frothed liquid mixture containing air bubbles and comprising latex, ethanolamine soap in an amount between 1% and about 10% by weight of the rubber solids in said latex, and a silicofluoride gelling agent in an amount between about ½% and about 5% by weight of said rubber solids; gelling said latex and said ethanolamine soap around said air bubbles by the action of said gelling agent thereon, to form a body of solidified froth containing said latex and having closed air cells distributed therein; and heating said body in a tightly sealed space to cure the latex in said body while substantially completely preventing escape of air from said body and thereby maintaining said air cells closed during the major portion of the latex curing period.

3. In a process of producing a latex foam sponge product, the steps which comprise; preparing a frothed liquid mixture containing air bubbles and comprising latex and ethanolamine soap, the proportion of said ethanolamine soap being between 1% and about 10% by weight of the rubber solids in said latex; adding to said mixture a silicofluoride gelling agent in an amount between about ½% and about 5% by weight of said rubber solids, to gell said latex and said ethanolamine soap around said bubbles and form a body of solidified froth having closed air cells distributed therein; and heating said body in a tightly sealed space to cure the latex in said body while substantially completely preventing escape of air from said body and thereby maintaining said air cells closed during the major portion of the latex curing period.

4. In a process of producing a latex foam sponge product, the steps which comprise: preparing a frothed liquid mixture containing air bubbles and comprising latex and ethanolamine soap, the proportion of said ethanolamine soap being between 1% and about 10% by weight of the rubber solids in said latex; gelling said latex and said ethanolamine soap around said bubbles to form a body of solidified froth having closed air cells distributed therein; heating said body in a tightly sealed space to cure the latex in said body while substantially completely preventing escape of air from said body and thereby maintaining said air cells closed during the major portion of the latex curing period; and continuing said heating of said body, while maintaining it in said sealed space, until the ethanolamine soap gel is converted to liquid form so as to form openings in the walls of the cured latex between the air cells and produce a latex foam sponge product having intercommunicating cells.

5. In a process of producing a latex foam sponge product, the steps which comprise: preparing a frothed liquid mixture containing air bubbles and comprising latex and ethanolamine soap, the proportion of said ethanolamine soap being between 1% and about 10% by weight of the rubber solids in said latex; preparing a gelling composition by mixing two parts by weight of finely divided sodium silicofluoride with from four to eight parts by weight of water and from one to three parts by weight of ethanolamine to form a gel and allowing said gelt to stand for a sufficient time to become fluid; and adding to said frothed liquid mixture an amount of said gelling composition sufficient to cause gelling of said latex and said ethanolamine soap around air bubbles and form a body of solidified froth containing said latex and having closed air cells distributed therein.

6. In a process of producing a latex foam sponge product, the steps which comprise: preparing a frothed liquid mixture containing air bubbles and comprising latex, ethanolamine soap in an amount between 1% and about 10% by weight of the rubber solids in said latex, sodium silicofluoride in an amount between about ½% and about 5% by weight of said rubber solids, and titanium dioxide in an amount between about ½% and about 5% by weight of said rubber solids; pouring said mixture into a mold; and gelling said latex and said ethanolamine soap around said air bubbles, to form a body of solidified froth containing said latex and having closed air cells distributed therein.

7. In a process of producing a latex foam sponge product, the steps which comprise: preparing a liquid frothing composition containing ethanolamine soap and titanium dioxide; adding said frothing composition to latex, the proportions of ethanolamine soap and titanium dioxide in said frothing composition and the amount of said frothing composition added to said latex being such as to provide a resulting mixture containing between 1% and about 10% of ethanolamine soap, and between about ½% and about 5% of titanium dioxide, by weight of the rubber solids in said latex; subjecting said resulting mixture to a frothing operation to form a frothed liquid mixture containing air bubbles; and gelling said latex and said ethanolamine soap around said air bubbles, to form a body of solidified froth containing said latex and having closed air cells distributed therein.

8. In a process of producing a latex foam sponge product, the steps which comprise: preparing a liquid frothing composition containing ethanolamine soap; preparing a gelling composition containing sodium silicofluoride and ethanolamine in proportions of about 1 to 3 parts of ethanolamine to two parts of sodium silicofluoride, by weight; adding said frothing composition and said gelling composition to latex in such proportions as to provide a resulting mixture containing between 1% and about 10% of ethanolamine soap, and between about ½% and about 5% of sodium silicofluoride, by weight of the rubber solids in said latex; subjecting said resulting mixture to a frothing operation to form a frothed liquid mixture containing air bubbles; gelling said latex and said ethanolamine soap around said air bubbles, to form a body of solidified froth containing said latex and having closed air cells distributed therein; and heating said body in a tightly sealed space to cure the latex in said body while substantially completely preventing escape of air from said body and thereby maintaining said air cells closed during the major portion of the latex curing period.

9. In a process of producing a latex foam sponge product, the steps which comprise: preparing a composition containing ethanolamine soap and sodium silicofluoride, together with a small amount of ethanolamine in addition to the ethanolamine in said soap; adding said composition to latex, the proportions of ethanolamine soap and sodium silicofluoride in said composition and the amount of said composition added to said latex being such as to provide a resulting mixture containing between 1% and about 10% of ethanolamine soap, and between about ½% and about 5% of sodium silicofluoride, by weight of the rubber solids in said latex; subjecting said resulting mixture to a frothing operation to form a frothed liquid mixture containing air bubbles; gelling said latex and said ethanolamine soap around said air bubbles, to form a body of solidified froth containing said latex and having closed air cells distributed therein; and heating said body in a tightly sealed space to cure the latex in said body while substantially completely preventing escape of air from said body and thereby maintaining said air cells closed during the major portion of the latex curing period.

GEORGE T. BAU.

(References on following page)

REFERENCES CITED

The following references are of record in the file of this patent:

UNITED STATES PATENTS

| Number | Name | Date |
|---|---|---|
| 1,828,481 | Trobridge et al. | Oct. 20, 1931 |
| 1,852,447 | Chapman et al. | Apr. 5, 1932 |
| 1,912,591 | Olin | June 6, 1933 |
| 2,290,567 | MacKay | July 21, 1942 |
| 2,325,637 | Stewart | Aug. 3, 1943 |
| 2,360,913 | Van Valkenburgh | Oct. 24, 1944 |
| 2,426,430 | Binns | Aug. 26, 1947 |

FOREIGN PATENTS

| Number | Country | Date |
|---|---|---|
| 438,795 | Great Britain | Nov. 18, 1935 |